United States Patent
Tajan et al.

(10) Patent No.: US 10,023,320 B2
(45) Date of Patent: Jul. 17, 2018

(54) PROPULSION UNIT WITH A PAIR OF PROPELLERS FOR AN AIRCRAFT

(71) Applicant: SNECMA, Paris (FR)

(72) Inventors: Sebastien Emile Philippe Tajan, Sucy en Brie (FR); Denis Louis Bocquet, Bois le Roi (FR); Gilles Alain Charier, La Grande Paroisse (FR)

(73) Assignee: SNECMA, Paris (FR)

(*) Notice: Subject to any disclaimer, the term of this patent is extended or adjusted under 35 U.S.C. 154(b) by 494 days.

(21) Appl. No.: 14/718,024

(22) Filed: May 20, 2015

(65) Prior Publication Data

US 2015/0336679 A1 Nov. 26, 2015

(30) Foreign Application Priority Data

May 21, 2014 (FR) ...................................... 14 54550

(51) Int. Cl.
*B64D 35/06* (2006.01)
*B64C 11/30* (2006.01)
(Continued)

(52) U.S. Cl.
CPC ............ *B64D 35/06* (2013.01); *B64C 11/306* (2013.01); *B64C 11/38* (2013.01); *B64D 2027/005* (2013.01); *Y02T 50/66* (2013.01)

(58) Field of Classification Search
CPC ........ F03D 1/025; F03D 17/0224; F01D 7/00; F02C 9/58; F05D 2220/324;
(Continued)

(56) References Cited

U.S. PATENT DOCUMENTS 1,806,603 A * 5/1931 Armitage .................. F16N 7/40
184/6.14
4,657,484 A * 4/1987 Wakeman ............. B64C 11/306
415/130
(Continued)

FOREIGN PATENT DOCUMENTS

FR 2 992 703 A1 6/2012
WO WO 2013050704 A1 * 4/2013 ........... B64C 11/385

*Primary Examiner* — Logan Kraft
*Assistant Examiner* — Joshua R Beebe
(74) *Attorney, Agent, or Firm* — Womble Bond Dickinson (US) LLP

(57) ABSTRACT

The present invention relates to a propulsion unit comprising a pair of contra-rotating coaxial propellers, that are referred to as upstream (2) and downstream (3), the downstream propeller, forming a rotating reference frame, being mounted for rotation about a central member forming a stationary reference frame, and being provided with a device for changing the pitch of the blades, characterized in that the downstream propeller is supported by bearings arranged externally on the cylindrical central support, an upstream bearing (40) of which is arranged downstream of a device for changing the pitch of the blades of the upstream propeller, and in that said device for changing the pitch of the downstream propeller comprises a linear actuator (23) in the stationary reference frame with an element (235) that is able to move axially along the axis of the downstream propeller, the upstream bearing comprising an inner ring that is rigidly connected to the linear actuator and an outer ring that is rigidly connected to a rotating casing (20) of the downstream propeller, and a movement-transmission mechanism (24) connecting said movable element of the linear actuator to the blades, comprising a load-transfer bearing arranged to transmit the axial forces from the linear actuator to the rotating reference frame of the downstream propeller.

9 Claims, 3 Drawing Sheets

(51) Int. Cl.
*F01D 7/00* (2006.01)
*B64C 11/38* (2006.01)
*B64D 27/00* (2006.01)

(58) Field of Classification Search
CPC ........... F05D 2220/325; F05D 2260/74; F05D 2260/70; F05D 2260/76; F05D 2260/79; Y02T 50/66; B64C 11/30; B64C 11/306; B64C 11/32; B64C 11/36; B64C 11/46; B64C 11/48; B64C 11/38; B64D 2027/005; F05B 2270/328; F02K 3/072; F04D 29/323; F04D 29/362
See application file for complete search history.

(56) References Cited

U.S. PATENT DOCUMENTS

| | | | | |
|---|---|---|---|---|
| 4,764,090 | A * | 8/1988 | Danson | F03D 3/068 |
| | | | | 416/119 |
| 4,842,484 | A * | 6/1989 | Johnson | B64C 11/306 |
| | | | | 415/130 |
| 4,927,329 | A * | 5/1990 | Kliman | F01D 7/00 |
| | | | | 416/127 |
| 5,209,429 | A * | 5/1993 | Doolin | B64C 27/32 |
| | | | | 244/17.11 |
| 2012/0070290 | A1 | 3/2012 | Balk et al. | |
| 2012/0093652 | A1* | 4/2012 | Belmonte | B64C 11/06 |
| | | | | 416/147 |
| 2013/0052016 | A1* | 2/2013 | Szymandera | B64C 11/308 |
| | | | | 416/128 |
| 2014/0294585 | A1* | 10/2014 | Escure | B64C 11/385 |
| | | | | 416/147 |

* cited by examiner

PROPULSION UNIT WITH A PAIR OF PROPELLERS FOR AN AIRCRAFT

FIELD OF THE INVENTION

The present invention relates to the field of turbine engines with a pair of coaxial and contra-rotating propulsion propellers for an aircraft, also referred to by the expressions "open rotor" and "unducted fan". The invention relates more particularly to the device for changing the pitch of the blades of the downstream propeller.

PRIOR ART

The current architecture of open-rotor turboshaft engines differs from that of the usual turbojet engines through the fact that the fan is no longer internal to the nacelle but external and is composed of two coaxially and contra-rotating propellers which may be situated downstream or upstream of the part of the engine forming the gas generator. This kind of architecture affords lower fuel consumption compared with the multiflow turbojet engines in service on commercial aircrafts. The present invention relates to engines with propellers arranged downstream of the gas generator.

The example of a turboshaft engine 1 with a pair of contra-rotating propellers, upstream 2 and downstream 3, depicted schematically in FIG. 1, comprises mainly, along a central longitudinal axis A and the airflow F flowing in the turboshaft engine from upstream to downstream, a gas generator unit 4, a propulsion unit 5 with the pair of contra-rotating propellers 2, 3 constituting the unducted (open rotor) fan, and, between the generator and the propellers, a unit 6 for transmitting the power delivered by the generator 4 in the direction of the propellers.

In particular, the gas generator unit 4 is situated inside a cylindrical nacelle 7 held by the structure of the aircraft (such as the rear part of the fuselage of an aircraft) and usually comprises, in the direction of the gas flow F into the nacelle 4 and according to the architecture of the single or two-spool gas generator, one or two compressors 8, an annular combustion chamber 9 and one or more turbines 10 arranged in series.

According to one embodiment, the intermediate unit 6 downstream of the gas generator unit comprises a power turbine 11 and a speed-reduction device such as an epicycloidal reducer 12. The rotor of the turbine 11 has radial blades 13 that have the hot airflow F emerging from the turbines of the gas-generator unit 4 passing therethrough and are set into rotation thereby. Between the rotary blade stages 13 there are fixed vane stages which are not visible and are connected to a fixed casing 14 of the turbine engine 1, the airflow F flowing between the casing 14 and the turbine rotor 11.

The rotary shaft 15 of the power turbine 11 is rigidly connected to a sun input shaft 16 of the reducer 12, the planet carrier and the toothed ring (not shown) of which respectively set into rotation, in opposite directions to each other, two concentric output shafts, outer 17 and inner 18, which are rigidly connected to the respective rotating casings 19, 20 of the upstream 2 and downstream 3 propellers of the propulsion unit 5.

In operation and briefly, the airflow F flowing in the unit 4 of the turboshaft engine 1 is compressed, and then mixed with fuel and burnt in the combustion chamber 9. The hot gases are expanded in the turbines 10 in order to set into opposite rotations, via the power turbine 11 and the epicycloidal reducer 12 of the intermediate unit 6, the propellers 2, 3, which provide the majority of the thrust. The hot gases are then ejected through the nozzle and contribute to the thrust of the turboshaft engine 1.

A device 22 and 21 for changing the pitch of the vanes 2A, 3A, respectively, of each propeller is provided to independently vary the setting thereof according to the various operating phases of the turboshaft engine, in order to optimise the aerodynamic performances thereof.

The systems responsible for the variable setting or pitch-change systems, also known by the abbreviation PCM, which stands for "pitch change mechanism", are traditionally installed at the core of the rotors; with one part placed in a rotating reference frame and another in a stationary reference frame.

The invention relates to the transformation of an engine power coming from the stationary reference frame in the form of an axial translation movement into a rotation movement about the setting axis on the rotating reference frame of the engine.

The invention relates more particularly to a system for changing the pitch of the downstream rotor.

The system for changing the pitch of the downstream rotor is special in that it is placed at the rear end of the engine where the rotor is in a projecting position and the space available in the fixed parts for bringing the power and providing mechanical, electrical and hydraulic interfaces is very limited.

For this change in pitch of the downstream rotor, the prior art discloses producing an actuation mechanism using an actuator in the rotating part of the rotor. FR 1357959, which is filed in the name of the present applicant, describes a solution of this type. An examination thereof shows that such a system is complex and that it has drawbacks:

The leakage level of fluids is high in the actuator. As a result the controllability of the variable setting system may easily deteriorate.

The same leakages also cause a limitation to the return speed of the blades resulting from the limitations on the hydraulic flow rate.

Manufacture of the variable setting devices is moreover made complex by the very tight tolerances required to ensure control of the fluid leaks.

For changing the pitch of the upstream rotor, a system described in FR 2 980 770 in the name of the present applicant is also known, comprising a linear-control annular fluidic actuator mounted so as to be rigidly connected to a fixed casing supporting the upstream rotor while being confined in a space available inside the upstream rotor and a connecting mechanism comprising a movement-transfer bearing, the internal collar of which is mounted concentrically on the movable part of the actuator and the external collar of which cooperates with the pivots of the rotor blades. It can be seen that that hub of this upstream rotor comprises a cylindrical element that is supported by a cylindrical element of the stator by means of two bearings that are arranged radially inside this cylindrical element of the stator. The inner ring of these is connected to the cylindrical element of the rotor and the outer ring thereof is connected to the cylindrical element of the stator.

This arrangement, which is suitable for the upstream rotor of the propeller pair, is however not suitable for a rotor, such as the downstream rotor of the pair, where the space available inside the rotor hub is even more restricted than in the case of the upstream rotor.

SUMMARY OF THE INVENTION

In accordance with the invention, these drawbacks are avoided with a propulsion unit comprising a pair of contra-rotating coaxial propellers, which are referred to as upstream and downstream relative to the flow of air passing therethrough, the downstream propeller, forming a rotating reference frame, being mounted for rotation about a cylindrical central support forming a stationary reference frame, and being provided with a device for changing the pitch of the blades, characterised in that the downstream propeller is supported by bearings arranged externally on the cylindrical central support, an upstream bearing of which is arranged downstream of a device for changing the pitch of the blades of the upstream propeller, and in that said device for changing the pitch of the upstream propeller comprises:

a. a linear actuator in the stationary reference frame with an element that is able to move axially along the axis of the downstream propeller, the upstream bearing comprising an inner ring that is rigidly connected to the linear actuator and an outer ring that is rigidly connected to a rotating casing of the downstream propeller, and b. a movement-transmission mechanism connecting said movable element of the linear actuator to the blades, comprising a load-transfer bearing arranged to transmit the axial forces from the linear actuator to the rotating reference frame of the downstream propeller.

Since the actuator is situated in the stationary reference frame, the movements thereof are solely translations and it is not set into rotation with the rotor. The result is a much simpler treatment of leakages and improved reliability. The positioning of the upstream bearing downstream of a device for changing the pitch of the blades of the upstream propeller, typically downstream of an actuator of said device for changing the pitch of the upstream propeller, makes it possible to avoid transmitting the forces in the fixed structure of the upstream propeller.

The upstream bearing comprises an inner ring that is rigidly connected to the linear actuator and an outer ring that is rigidly connected to a rotating casing of the downstream propeller. The force loop thus remains confined within the rotating casing, the reaction to the forces produced by the actuator passing through the upstream bearing in order to close the loop. The path of forces of the variable setting system and in particular the reaction of the actuator, do not pass through the fixed parts of the engine.

The device for changing the pitch of the upstream propeller may comprise a linear actuator arranged entirely upstream of the upstream bearing of the downstream propeller and separate from the linear actuator of the downstream propeller. Management of the forces of the upstream propeller is thus separated from that of the downstream propeller.

In accordance with one embodiment, the bearing for transferring the load from the movement-transmission mechanism comprises a non-rotating cylindrical collar that is rigidly connected to the movable element of the linear actuator and a rotating collar that is mounted on the non-rotating collar by means of bearings.

Advantageously, the non-rotating cylindrical collar is connected to the linear actuator by anti-rotation means. This means is formed for example by rods arranged axially around the actuator and held fixed by rollers.

In accordance with another feature, the upstream bearing is situated upstream of the blades. This provision makes it possible to have a force path for the variable setting system and in particular the reaction of the actuator not passing through the fixed parts of the engine.

In accordance with one embodiment, the propulsion unit comprises a downstream bearing situated downstream of the blades. However, arranging the downstream bearing further upstream close to the upstream bearing also forms part of the invention. The two bearings comprise a ball bearing absorbing the axial and radial loads in the variable setting system and a roller bearing absorbing the radial loads of the variable setting system.

The bearings of the movement-transmission device may be lubricated with oil supplied through telescopic pipes.

The invention also relates to a turboshaft engine comprising a gas generator and a propulsion unit described above, downstream of the gas generator.

DESCRIPTION OF THE DRAWINGS

The invention will be better understood, and other aims, details, features and advantages thereof will become more apparent from the following detailed explanatory description of an embodiment of the invention given by way of purely illustrative and non-limiting example, with reference to the accompanying schematic drawings.

In these drawings.

DETAILED DESCRIPTION OF AN EMBODIMENT OF THE INVENTION

Figure 1:
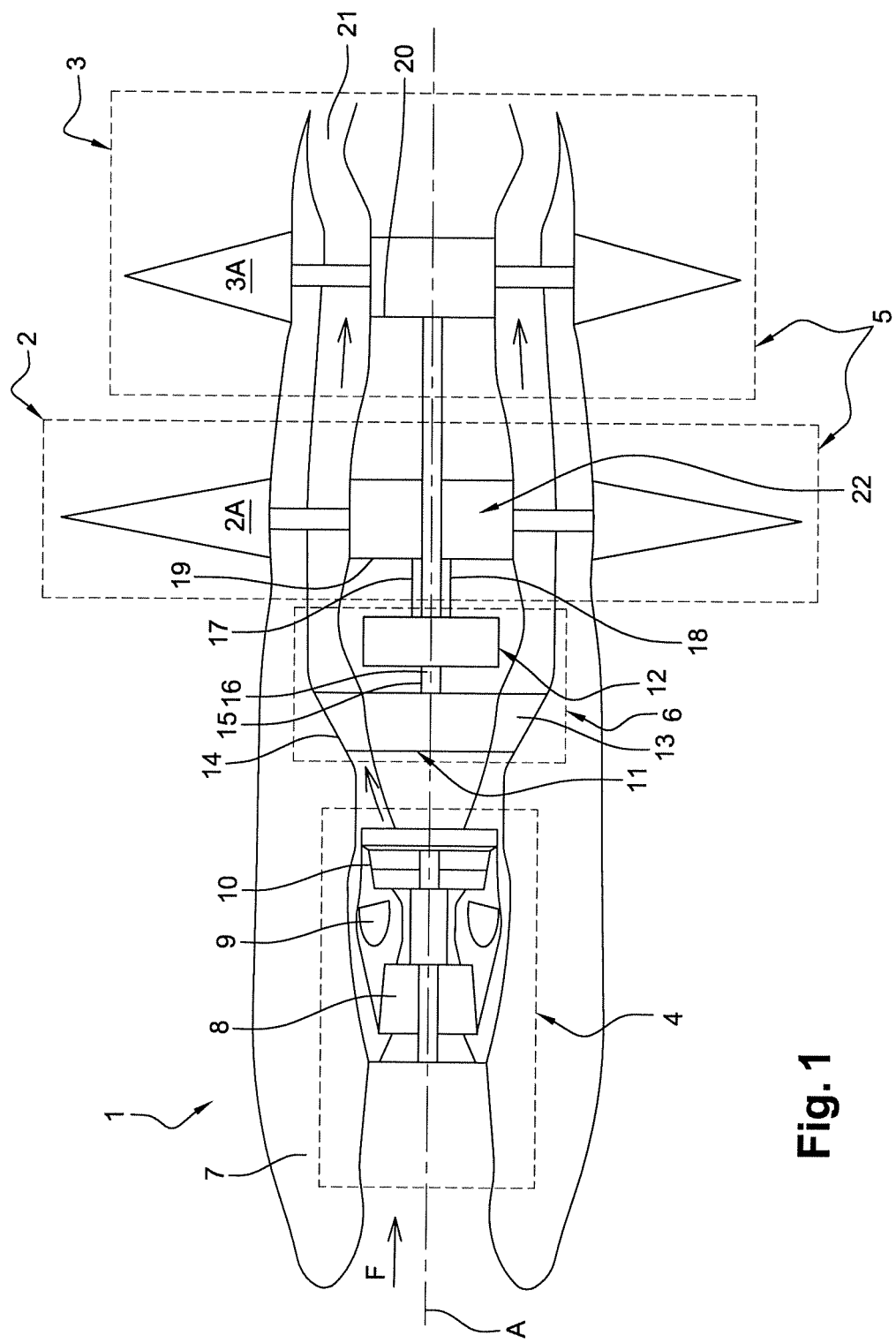
FIG. 1 is a schematic cross-sectional of a fast-propeller turboshaft engine.
Figure 2:
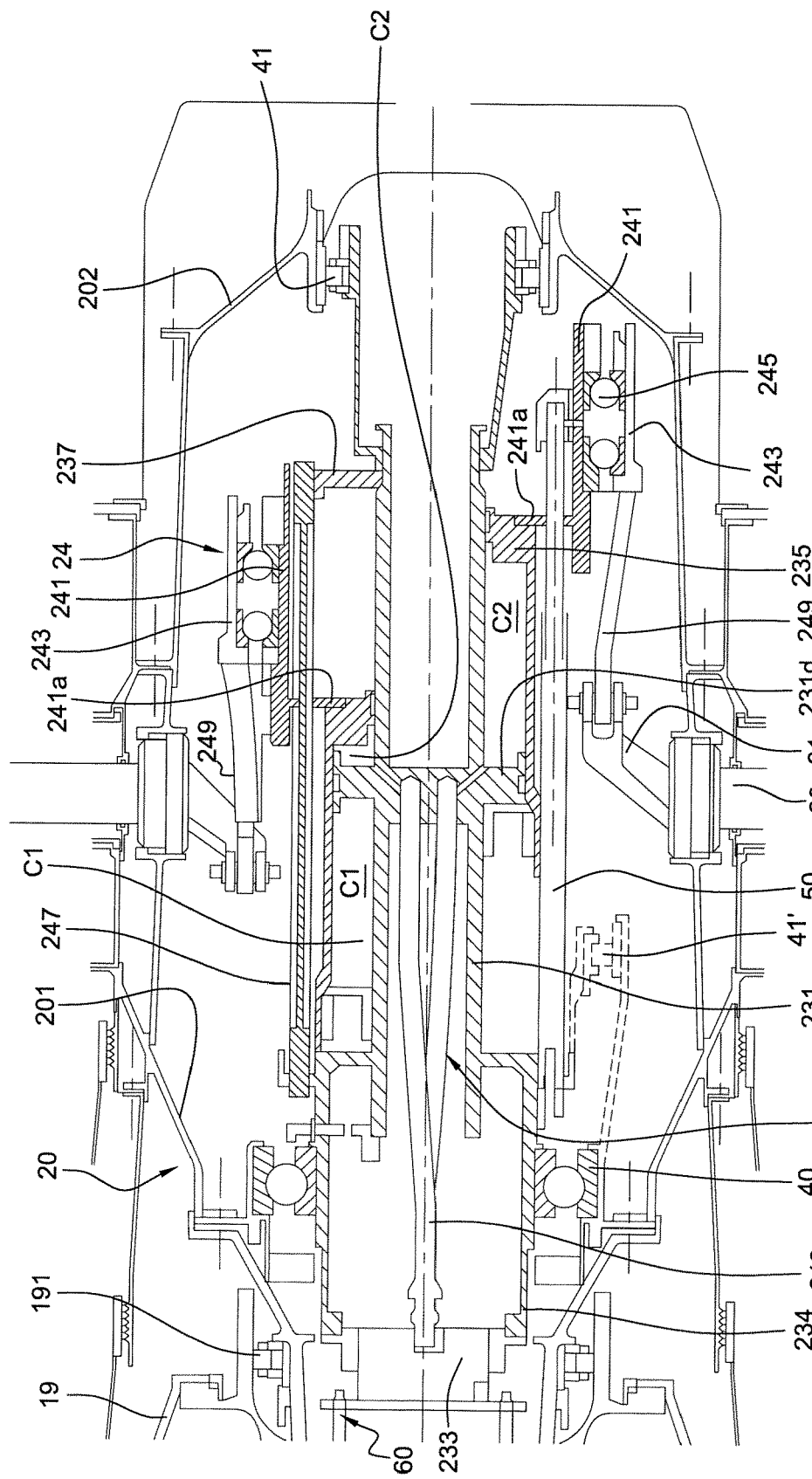
FIG. 2 is an axial section of a pitch-change system according to the invention for the variable setting of the blades of the downstream rotor of a propulsion unit with a pair of propellers; it comprises an actuator shown in two positions.
Figure 3:
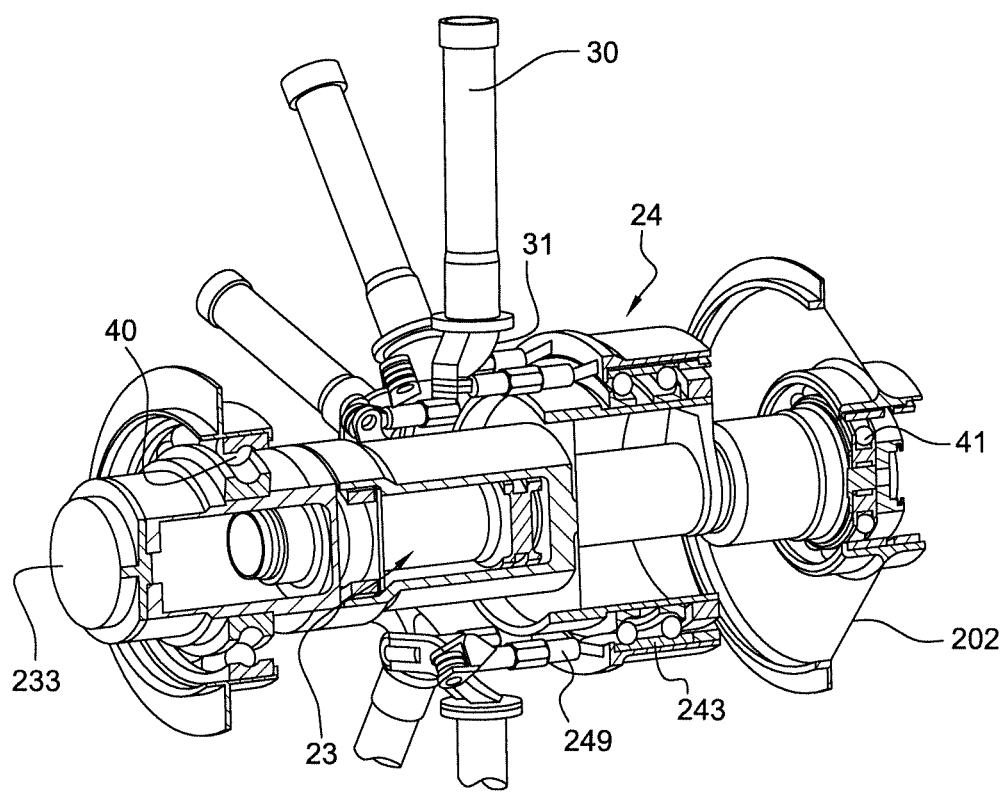
FIG. 3 is a perspective view of the pitch-change system in FIG. 2.

With reference to FIG. 2 and FIG. 3, the schematic view of a pitch-change system for the blades of the downstream rotor in a pair of propellers of an engine as described with FIG. 1 can be seen.

To the left in FIG. 2, the references 19 and 20 denote the rotating casings of the upstream 19 and downstream 20 rotors of the pair of propellers. These two propellers are contra-rotating and are driven by the turbine 11, not shown, situated upstream with respect to FIG. 2.

The pitch-change device of the invention is situated inside the downstream rotating casing 20. This downstream rotating casing 20 comprises a plurality of elements 201 and 202 which are bolted to one another and support the pivots 30 of the blades 3A of the downstream rotor, which extend radially in a transverse plane relative to the axis of the engine. The rotating casing 20 is supported itself by an inter-shaft bearing 191; it projects. The pivots 30 are mounted so as to rotate in bearings and the setting thereof is controlled by levers 31 that extend radially relative to the pivot axis of the pivots 30. The angular position of the pivots 30 is provided by the pitch-change device which is described below.

This device comprises a linear actuator 23 in a stationary reference frame and a mechanism 24 for transmitting movement to the blades.

The linear actuator is situated in line with a sleeve 60 for routing the ground equipment, only the downstream end of which can be seen. This sleeve is housed inside the rotary shafts driving the rotors while being fixed relative to these shafts. It constitutes a stationary reference frame. FR 1450440 in the name of the present applicant describes a connection device which is housed inside the shafts of the rotors of the pair of propellers, allowing blind assembly.

The actuator comprises a hollow cylindrical member 231 in line with a bell housing 234 which is mounted on a plate 233 which is bolted at the end of the sleeve 60. The cylindrical element comprises a transverse disc 231d.

The actuator also comprises a cylindrical element 235 that is able to move axially relative to the radial disc 231d. The cylindrical element 235 forms, with the element 231 and the disc 231d thereof, two actuator chambers C1 and C2. These two chambers are respectively in fluidic communication with two pipes 240. These two ducts are fixed to the plate 233 and are supplied with actuating fluid by the sleeve 60. FIG. 2 shows the actuator in two extreme positions. The top part of the figure shows the actuator with the chamber C1 extended and the chamber C2 in reduced volume. The bottom part of the figure shows, conversely, the chamber C2 extended and the chamber C1 in reduced volume. This corresponds to two extreme positions of the movable element 235. In the top part of the figure, the movable element 235 is in the extreme position towards the left with respect to the figure and in the bottom part of the figure the movable element of the actuator is in the extreme position towards the right with respect to the figure. By acting on the supply of actuating fluid to the pipes 240, it is thus possible to move the movable element in translation as required.

The movable element 235 is connected to a mechanism 24 for transmitting movement to the pivots 30 of the blades 3A.

This mechanism 24 comprises a collar 241 that is rigidly connected to the movable element 235 and coaxial therewith. The collar 241 is bolted here, by means of a radial flange 241a, to the downstream face of the movable element 235. The collar 241 is also in sliding abutment on a radial leg 237 that is rigidly connected to the cylindrical body 231.

Anti-rotation axial rods 247 extend along the fixed body of the actuator. These rods pass through the radial flanges 241a for fixing the collar. Rollers, which are not visible in FIG. 2, provide the axial sliding of the collar 241 along these anti-rotation rods and prevent any rotation movement of the rod about the axis of the engine.

The transmission mechanism 24 comprises a rotating collar 243 that is coaxial with and connected to the non-rotating collar 241 by means of bearings 245. Here the bearings are double. The two collars 241 and 243 form the cage of a ball bearing. The rotating collar can rotate about the collar 241, while being immobilised axially relative to said collar.

The rotating collar 243 is connected by links 249 to the levers 31 actuating the pivots 30 of the rotor blades.

The downstream propeller is supported by bearings arranged externally on the cylindrical central support. A first bearing 40, preferably of the ball-bearing type, provides the radial and axial holding of the actuator relative to the rotating casing of the downstream propeller. This bearing is situated upstream relative to the propeller blades. The upstream bearing 40 comprises an inner ring that is rigidly connected to the linear actuator 23 (optionally rigidly connected to the piston 235), and an outer ring that is rigidly connected to a rotating casing 20 of the downstream propeller. A second bearing 41 is situated downstream relative to the rotor blades. The function thereof is substantially that of providing radial holding of the end of the actuator relative to the rotating casing 20.

In a variant shown in broken lines, the second bearing 41' is arranged upstream of the blades while being downstream of the first bearing. Finally, the lubrication of the bearings of the mechanism 24 is provided, according to the embodiment shown, by telescopic pipes 50 connected at one end to a supply from the sleeve and at the other end to the bearing cage 245.

The functioning of this device is deduced from the above description. When a chamber C1 or C2 is supplied with actuating fluid by the pipes 234 from the control box, not shown, and the sleeve through the plate 233, the movable element 235 moves for example in FIG. 2 from the position shown in the top half of the figure to the position corresponding to the bottom half of the figure. The movement-transmission mechanism moves axially. The rotating external collar 243 is then rotated by the rotating casing 20. This axial movement sets the pivots into rotation about their respective axes because of the connection by the levers and links. By virtue of this arrangement the force loop remains confined to the inside of the rotating casing, the reaction to the forces produced by the actuator passing through the first bearing in order to close the loop.

In summary, the downstream system is based on the following principles:

The actuator is situated in the stationary reference frame—that is to say the movements thereof are translations. The actuator is not set into rotation with the rotor.

The actuator is positioned in the downstream rotor by means of bearings. The force path of the downstream system and in particular the reaction of the actuator does not pass through the fixed parts of the engine.

The mechanical, electrical and hydraulic interface is unique with the fixed part of the engine placed at the rear of the system in the fixed part.

The movement is transmitted via a load transfer bearing for transmitting the setting forces and passing from the stationary reference frame to the rotating reference frame.

The absorption of the torque created by the bearing is applied to the actuator via an anti-rotation device in the fixed part.

The positioning of the downstream system by means of two bearings; a ball bearing absorbing the axial and radial loads of the system and a roller bearing absorbing the radial loads.

The lubrication of the downstream chamber with the oil residues used for the lubrication of the bearings of the system.

The invention claimed is:

1. A propulsion unit for an aircraft comprising a pair of contra-rotating coaxial propellers that are referred to as upstream and downstream relative to the flow of air passing through it, the downstream propeller, forming a rotating reference frame, being mounted for rotation about a cylindrical central support forming a stationary reference frame, and being provided with a device for changing the pitch of the vanes, wherein the downstream propeller is supported by bearings arranged externally on the cylindrical central support, an upstream bearing of which is arranged downstream of a device for changing the pitch of the blades of the upstream propeller, and in that said device for changing the pitch of the downstream propeller comprises:
   a. a linear actuator in the stationary reference frame with an element that is able to move axially along the axis of the downstream propeller, the upstream bearing comprising an inner ring that is rigidly connected to the linear actuator and an outer ring that is rigidly connected to a rotating casing of the downstream propeller, and
   b. a movement-transmission mechanism connecting said movable element of the linear actuator to the blades, comprising a load-transfer bearing arranged to transmit the axial forces from the linear actuator to the rotating reference frame of the downstream propeller, wherein the load transfer bearing of the movement-transmission mechanism comprises a non-rotating cylindrical collar that is rigidly connected to the axially movable element of the linear actuator, and a rotating collar mounted on the non-rotating collar by means of bearings.

2. The propulsion unit according to claim 1, wherein the device for changing the pitch of the upstream propeller comprises a linear actuator arranged entirely upstream of the upstream bearing of the downstream propeller and separate from the linear actuator of the downstream propeller.

3. The propulsion unit according to claim 1, characterised in that the non-rotating cylindrical collar is connected to the linear actuator by an anti-rotation means.

4. The propulsion unit according to claim 1, wherein the upstream bearing is upstream of the blades.

5. The propulsion unit according to claim 1, further comprising a downstream bearing, situated downstream of the blades.

6. The propulsion unit according to claim 1 further comprising a downstream bearing situated downstream close to the upstream bearing and upstream of the blades.

7. The propulsion unit according to claim 1, wherein the bearings of the movement transmission device are lubricated by oil supplied by telescopic pipes.

8. A turboshaft engine, comprising a gas generator and a propulsion unit according to claim 1 downstream of the gas generator.

9. A propulsion unit for an aircraft comprising a pair of contra-rotating coaxial propellers that are referred to as upstream and downstream relative to the flow of air passing through it, the downstream propeller, forming a rotating reference frame, being mounted for rotation about a cylindrical central support forming a stationary reference frame, and being provided with a device for changing the pitch of the vanes, wherein the downstream propeller is supported by bearings arranged externally on the cylindrical central support, an upstream bearing of which is arranged downstream of a device for changing the pitch of the blades of the upstream propeller, and in that said device for changing the pitch of the downstream propeller comprises:

a. a linear actuator in the stationary reference frame with an element that is able to move axially along the axis of the downstream propeller, the upstream bearing comprising an inner ring that is rigidly connected to the linear actuator and an outer ring that is rigidly connected to a rotating casing of the downstream propeller, and a movement-transmission mechanism connecting said movable element of the linear actuator to the blades, comprising a load-transfer bearing arranged to transmit the axial forces from the linear actuator to the rotating reference frame of the downstream propeller, wherein the load transfer bearing of the movement-transmission mechanism comprises a non-rotating cylindrical collar that is rigidly connected to the axially movable element of the linear actuator, and a rotating collar mounted on the non-rotating collar by means of bearings, wherein the device for changing the pitch of the upstream propeller comprises a linear actuator arranged entirely upstream of the upstream bearing of the downstream propeller and separate from the linear actuator of the downstream propeller, and wherein the upstream bearing is upstream of the blades.

* * * * *